(12) United States Patent
Hakemeyer et al.

(10) Patent No.: US 8,964,776 B2
(45) Date of Patent: Feb. 24, 2015

(54) SHARED USE OF TIME SLOTS

(75) Inventors: Frank Hakemeyer, Horn-Bad Meinberg (DE); Vladimir Fröse, Bad Oeynhausen (DE); Maik Stemme, Auetal (DE); Stefan Witte, Minden (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 13/394,698

(22) PCT Filed: Sep. 17, 2010

(86) PCT No.: PCT/EP2010/063726
§ 371 (c)(1),
(2), (4) Date: May 15, 2012

(87) PCT Pub. No.: WO2011/033081
PCT Pub. Date: Mar. 24, 2011

(65) Prior Publication Data
US 2012/0221667 A1    Aug. 30, 2012

(30) Foreign Application Priority Data
Sep. 18, 2009    (DE) .......................... 10 2009 041 834

(51) Int. Cl.
*G06F 15/16*    (2006.01)
*H04W 74/02*    (2009.01)
(52) U.S. Cl.
CPC ..................................... *H04W 74/02* (2013.01)
USPC .......................... 370/458; 709/234; 370/395.4
(58) Field of Classification Search
CPC ..... H04L 47/125; H04L 12/42; H04L 12/423; H04L 12/43; H04Q 11/04; G06F 13/37
USPC ........ 709/208, 234; 370/395.41, 395.42, 458; 714/57
See application file for complete search history.

(56) References Cited

U.S. PATENT DOCUMENTS

| 5,012,469 A | 4/1991 | Sardana |
| 5,278,833 A * | 1/1994 | Crisler et al. ................. 370/348 |

(Continued)

FOREIGN PATENT DOCUMENTS

| CN | 1 443 412 A | 1/2006 |
| EP | 1094636 | 4/2001 |

(Continued)

OTHER PUBLICATIONS

International Preliminary Report on Patentability and Written Opinion issued in PCT/EP2010/06726 mailed on Apr. 3, 2012.

(Continued)

*Primary Examiner* — Douglas Blair
(74) *Attorney, Agent, or Firm* — DLA Piper LLP (US)

(57) ABSTRACT

The invention relates to a network comprising at least one first client and at least two second clients connected to the first client by a message transmission device, wherein the network is configured such that there is communication between the first client and the second clients in a communication time slot and data can be transmitted between the first client and the second clients in the communication time slot, said communication time slot having at least one first message time slot and one second message time slot, wherein the first message time slot can be used by a selected second client to transmit a message to the first client and the second message time slot can be used by a plurality of second clients to transmit a message to the first client.

24 Claims, 2 Drawing Sheets

(56) References Cited

U.S. PATENT DOCUMENTS

Figure 1:
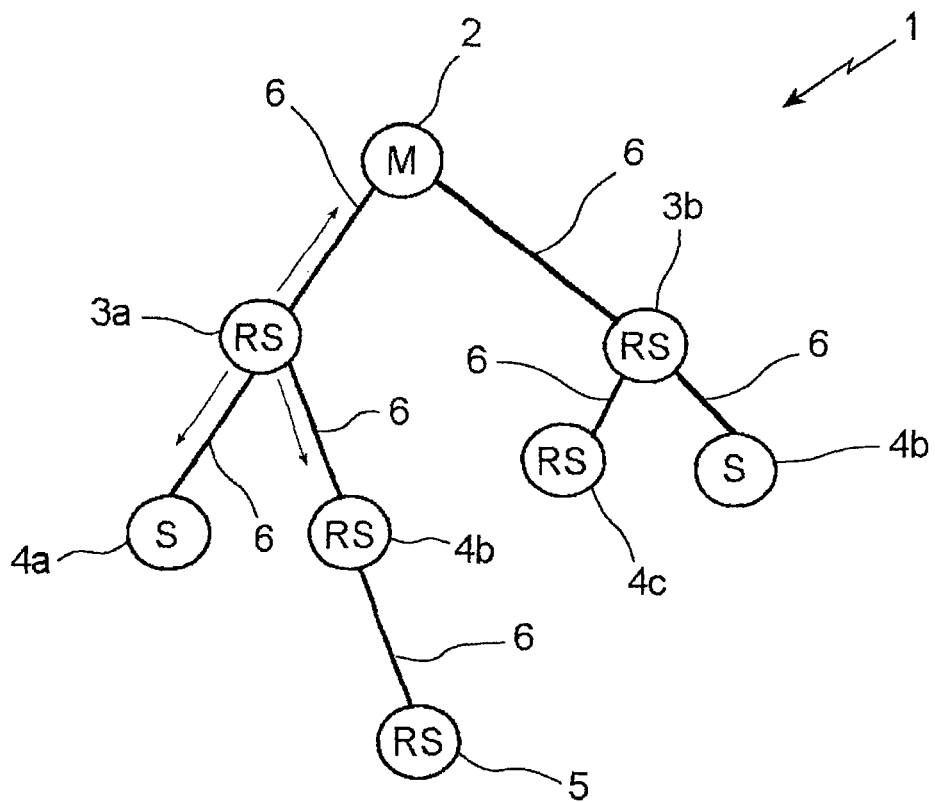

| | | | |
|---|---|---|---|
| 5,854,900 | A | 12/1998 | Kalkunte et al. |
| 5,920,547 | A * | 7/1999 | Werth .................... 370/280 |
| 6,205,153 | B1 * | 3/2001 | Shaffer et al. ............. 370/445 |
| 6,587,449 | B1 * | 7/2003 | Bartolome Pascual et al. .................... 370/336 |
| 6,839,333 | B1 * | 1/2005 | Åkerberg ................. 370/330 |
| 7,142,880 | B2 | 11/2006 | Schmandt et al. |
| 7,342,911 | B2 * | 3/2008 | Tollii et al. ............... 370/345 |
| 7,558,238 | B1 | 7/2009 | Sun et al. |
| 7,565,674 | B2 * | 7/2009 | Motoe et al. .............. 725/81 |
| 2001/0043574 | A1 * | 11/2001 | Nguyen et al. ............ 370/316 |
| 2003/0115369 | A1 * | 6/2003 | Walter et al. ............. 709/253 |
| 2003/0137986 | A1 | 7/2003 | Kaku |
| 2003/0145334 | A1 * | 7/2003 | Motoe et al. ............. 725/123 |
| 2004/0228317 | A1 * | 11/2004 | Tolli et al. ............... 370/345 |
| 2005/0044249 | A1 | 2/2005 | Teng |
| 2008/0112387 | A1 * | 5/2008 | Gandham et al. ......... 370/345 |

FOREIGN PATENT DOCUMENTS

| | | | |
|---|---|---|---|
| WO | WO9749200 | A1 * | 12/1997 |
| WO | WO 2004102899 | A1 * | 11/2004 ............. H04L 12/56 |
| WO | WO 2005/067215 | | 7/2005 |

OTHER PUBLICATIONS

Bahr, Michael et al.: "Shared Group Timeslots", Project: IEEE P802.15 Working Group for Wireless Personal Area Networks (WPANS), No. IEEE 802.15-18/0827r0, Nov. 10, 2008, pp. 1-11.

Berlemann, L., Hiertz, G. & Walke, B.: "Reservation-based Spectrum Load Smoothing as Cognitive Medium Access for Spectrum Sharing Wireless Networks", Proceedings of European Wireless Conference 2005, Apr. 13, 2005, pp. 547-553, XP002610170, Nicosia, Cyprus, ISBN: 3-8007-2886-9.

International Search Report of the International Search Authority; dated Dec. 14, 2010, in the corresponding PCT application PCT/EP2010/063726, German and English, 7 pages.

Chinese Office Action for 201080041558.4 dated Apr. 1, 2014, 2 pgs.

* cited by examiner

SHARED USE OF TIME SLOTS

CROSS-REFERENCE TO RELATED APPLICATIONS

This application is a National Stage of International Application No. PCT/EP2010/063726, filed Sep. 17, 2010, published as WO2011/033081A1, which, in turn, claims the benefit of German Patent Application No. 10 2009 041 834.2, filed Sep. 18, 2009, which are incorporated herein by reference in entirety.

The invention relates to a network with at least one first Client and at least two second Clients connected with the first Client by a message transmission device.

Such networks are well-known. Furthermore, it is well-known that such a network is structured as a logical "tree structure". In a tree structure, a Client is at the top, the other Clients are arranged on the branches or at the ends of the tree structure.

Depending on the function of the Client, there is a distinction between "Master", "Repeater-Slave" and "Slave". The "Master"-Client constitutes the central point of the network. Initialization of the network and network-specific functions are usually regulated by the Master. Without a Master, the network cannot function. A Repeater-Client can relay messages between the Repeater-Slave connected Clients. A Slave-Client is an endpoint of the network. A connection in the direction of the Master is called an "Uplink", and a connection away from the Master is a "Downlink". A Repeater-Slave Client with several Downlinks is called a "Parent". The Clients that are directly connected with the Repeater-Slave-Clients via these downlinks are called "Children". In a network configured as a tree structure, the "Master"-Clients are at the top of the network.

Many networks, especially wireless networks, work via a polling method. The polling method is an access method in which the Master-Client asks other Clients connected to it, in turn, if they would like to transmit. This means that the Master "polls" each and every Client, and exchanges messages in a point-to-point operation with the polled Clients.

The polling process has at this point only a single communication between the Master and another Client in the network. The disadvantage here is that a randomly occurring event may be greatly delayed by a Client until it can be forwarded to the Master. In particular, if the Master has just communicated with this Client, then the delay would be a complete polling cycle.

An advantage of the polling process is that as long as the Master can communicate with a Client, it is able to exchange the existing data. If a large amount of data is exchanged, then this will increase the communication time; if only a small amount of data is present, then this shortens the communication time. Another advantage of the polling process is that it is easy to implement, since it generates almost no protocol overhead, which means that there is only a small amount of additional protocol-related information. The latter property makes the polling method particularly interesting for wireless networks.

In addition, networks are known to work under "Fixed Assigned Protocols". In such protocols, the communication between the Clients of the network is fixed. It uses time-based protocols, such as TDMA (Time Division Multiple Access) or TSMP (Time Synchronized Mesh Protocol). In networks that are established with such protocols, each Client is assigned a fixed time slot in which it is allowed to transmit for a specified duration of time. Such protocols have the advantage that they are deterministic. They enable clear statements to be made, for example, at the point when the entire network has exchanged data. The disadvantage however is that, for randomly occurring events they can be transmitted only after a delay, an event may only be communicated by a Client in the next time slot assigned to that Client.

In addition, we understand that networks use the event-driven protocols, such as "Random Access Protocols". In the CAN (Controller Area Network)-Bus-Technology, the Clients attempt to use the "Bus" whenever the Client has received an event, such as a change of status. Since the occurrence of events cannot be planned, mechanisms are provided to prevent a simultaneous request for the Bus by multiple Clients. An example is the CSMA (Carrier Sense Multiple Access) method, in which the medium is first checked for availability and then, if the availability is there, it is used.

A disadvantage of the event-driven protocols is that high latency is possible in the exchange of messages between Clients, in particular at higher levels of utilization of the network.

The purpose of the invention is to provide a network that allows on one hand, a time-predictable or calculable communication between Clients, and on the other hand, one that offers the possibility of rapid transmission from any Client upon the occurrence of an event.

This problem can be solved by a network based on independent Claim #1. Advantageous elements of the invention are set forth in the attached claims.

The invented network comprises at least one first Client and at least two second Clients connected with the first Client by a message transmission device, wherein the network is configured such that there is communication between the first Client and the second Clients in a communication time slot, and data can be transmitted between the first Client and the second Clients in the communication time slot, said communication time slot having at least one first message time slot and one second message time slot, wherein the first message time slot can be used by a selected second Client to transmit a message to the first Client and the second message time slot can be used by a plurality of second Clients to transmit a message to the first Client.

A "message" is understood in the context of the invention to be a limited amount of data. In particular, a message may be a data packet.

The first message time slot of the communication time slot is always assigned to a specific second Client. Only this particular second Client can use the first message time slot to transmit a message to the first Client. This allows, for example, through the specifying of the sequence, the opportunity for all second Clients to, within a cycle of several communication time slots, transmit a message within a communication time slot to the first Client. This makes it possible to predict or calculate the time that will pass for a message to be transmitted from a second Client to the first Client.

The second message time slot of a communication time slot can be used by several second Clients to transmit a message to the first Client. In contrast to the first message time slot, the second message time slot is not reserved for a specific second party. The second message time slot makes it possible to transmit an event occurring to a second Client, in the form of a message to the first Client, without making it necessary for the second Client to wait until one of its first message time slots is available. In this way, it allows the second Clients to transmit events occurring in the form of a message to the first Client in a shorter period of time.

As an advantageous element of the invention, the network is configured such that the first Client confirms to the second Client, that a message from the second Client to the first Client that was transmitted in the second message time slot was received by the first Client. This allows the second Client to determine whether its message was successfully transmitted, or if the transmission of this message has not taken place. For example, the transmission of the message may not have succeeded if another second Client has also utilized the second message time slot for the transmission of a message.

A further advantageous element of the invention provides for the second Client that has received no confirmation that its message transmitted in the second message time slot was received by the first Client, to attempt to transmit the message again in the second message time slot either immediately or in the next following communication time slot.

The first Client may, in particular, be a Master-Client; the second Client associated with the Master-Client may be Slave-Clients and/or Repeater-Slave-Clients. It is also possible that the first Client is a Parent-Client, and several second Clients are Child-Clients of this Parent-Client.

The preferred elements of the invention are discussed in the following attached drawings.

As shown

Figure 2:
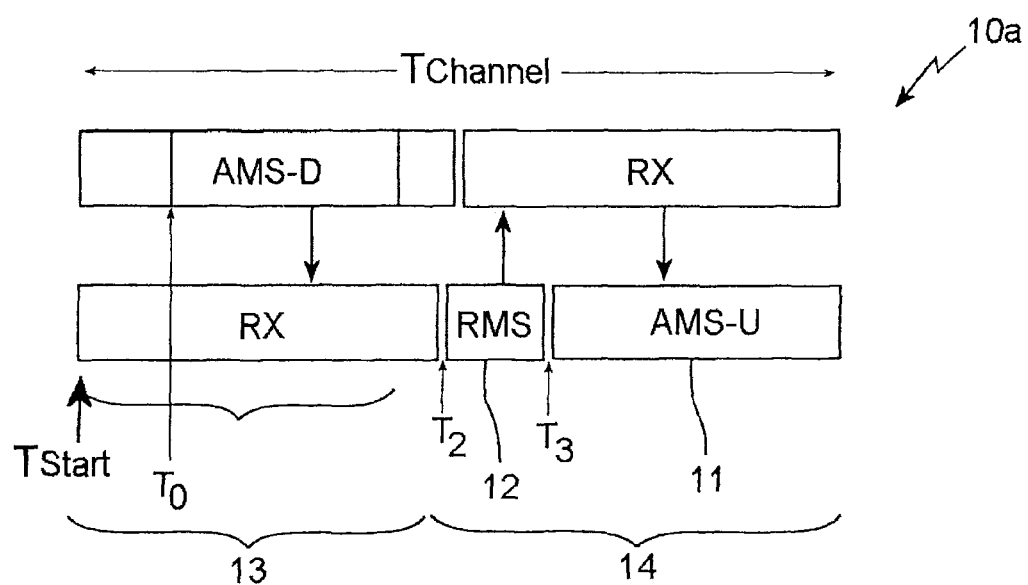
Figure 3:
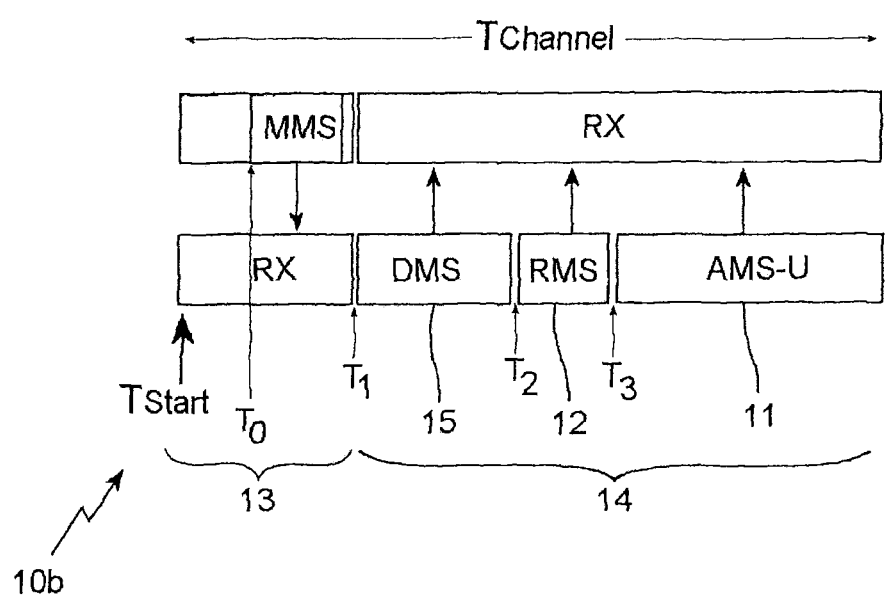

FIG. 1 a structure of an element of the invented network,

FIG. 2 a schematic representation of a communication time slot in which messages between Clients of the network shown in FIG. 1 are able to be exchanged, and FIG. 3 a schematic view of a second communication time slot in which messages between Clients of the network shown in FIG. 1 are able to be exchanged.

FIG. 1 shows the structure of one element of an invented network 1.

Network 1 comprises several Clients and is structured in the form of a tree structure. The top of the tree structure of network 1 has a Master (M)-Client 2. Master-Client 2 is connected with two Repeater-Slave (RS)-Clients 3a, 3b over a message transmission device 6. The first Repeater-Slave-Client 3a in turn is connected over message transmission device 6 with a Slave (S)-Client 4a and with another Repeater-Slave-Client 4b. The second Repeater-Slave-Client 3b is connected over a message transmission device 6 with another Repeater-Slave 4c and a Slave-Client 4d. The Repeater-Slave Client 4b is connected to another Repeater-Slave-Client 5.

Master-Client 2 is the central point of network 1. Initialization and network-specific functions are controlled by Master-Client 2. The Repeater-Slaves 3a, 3b, 4b are organized so that they pass messages between the Clients connected to them. The Slave-Clients 4a, 4b and Repeater-Slave-Client 5 constitute the endpoints of network 1.

Network 1, in this example, is a wireless network. The Clients of network 1 are radio stations, and the message transmission between the Clients takes place using radio waves. The message transmission device 6 is, in this case, a medium that can transmit radio waves over the air in particular. Alternatively, network 1 can be designed, for example, as a wired network. Message transmission device 6 would, in this case, be comprised of one or more wires, conductors or cables that connect the individual Clients of the network for the purpose of exchanging messages with each other.

Network 1 is configured such that Master-Client 2 is in contact with the other Clients of the network via a polling method. Via the emitted polling signals 2 by the Repeater-Slave-Clients 3a, 3b connected to Master-Client, the Master-Client 2 can initiate a data exchange between itself and each of the polled Repeater-Slave-Clients 3a, 3b. The Repeater-Slave-Clients 3a, 3b forward the polling signal from the Master-Client 2 to the End-Clients 4a, 5 (via the Repeater-Slave-Client 4b), 4c and 4d that are polled by Master-Client 2. In this way, within one polling cycle, a data exchange between Master-Client 2 and the four End-Clients 4a, 5, 4c and 4d can be initiated.

Master-Client 2 polls the End-Clients 4a, 5, 4c, 4d for a specified time interval $T_{channel}$. By setting the interval of $T_{channel}$, the entire network operates like a TDMA method with a fixed timeframe. This, in particular, allows for the prediction of the response time of network 1, which is determined by the quantity of End-Clients 4a, 5, 4c and 4d.

The time interval $T_{channel}$ defines a communication time slot in which data can be transmitted between the Clients. During operations, network 1 comprises a large number of such communication time slots in succession.

FIG. 2 shows the initial elements of communication time slot 10a. Communication time slot 10a is, in this example, a communication time slot in which Master-Client 2 and Repeater-Slave-Client 3a communicate.

Communication time slot 10a is divided into a transmission time slot 13 and a receiving time slot 14. In transmission time slot 13, Master-Client 2 can transmit a message to Repeater-Slave-Client 3a, wherein Repeater-Slave-Client 3a acts as an RX receiver. In receiving time slot 14, Repeater-Slave-Client 3a transmits a message to Master-Client 2, wherein during this time period Master-Client 2 acts as the RX receiver.

Transmission time slot 13 and receiving time slot 14 may be divided into several time slots. In this example, transmission time slot 13 includes an Application Message Slot-Downlink (AMS-D), which starts at time $T_0$. $T_0$ is shifted towards the start of communication time slot 10a, $T_{Start}$. The time interval between $T_{Start}$ and $T_0$, for example, can be used for synchronization operations between Clients.

Receiving time slot 14 is divided into a first message time slot 11 (AMS-U—Application Message Slot-Uplink) and a second message time slot 12 (RMS—Random Message Slot). The second message time slot 12 begins at the end of transmission time slot 13 at the time $T_2$, then first message time slot 11 follows at time $T_3$. The order of the first message time slot 11 and second message time slot 12 may be switched.

The first message time slot 11 is assigned to a designated Client, herein Repeater-Slave-Client 3a, and can be used only by Repeater-Slave-Client 3a. The second message time slot 12 on the other hand, can be used by Repeater-Slave-Client 3a, as well as by Repeater-Slave-Client 3b, to transmit messages to the Master-Client 2.

If one of the Repeater-Slave-Clients 3a, 3b would like to transmit a message to the Master-Client 2 via the second message time slot 12, then for this particular transmission, the second message time slot 12 of the immediately following communications time slot can be used. Alternatively, it is also possible to use the second message time slot 12 of any following R communication time slot, where R is an integer wherein R≥1. It is preferable to select R using an appropriate upper limit on a random basis.

If Master-Client 2 receives a message transmitted over the second message time slot 12, then Master-Client 2 confirms its receipt to Repeater-Slave-Client 3a or 3b, depending on which had sent this message. The confirmation takes place by transmitting an appropriate message in the following communication time slot between Master-Client 2 and Repeater-Slave-Client 3a, 3b, depending on which had sent this message, specifically in a Management Message-Slot (MMS), as further explained later.

In the absence of confirmation, Repeater-Slave-Clients 3a, 3b shall attempt to again transmit the message in the second message time slot 12 of a following communication time slot. For this message, the Repeater-Slave-Clients 3a, 3b may, upon the lack of confirmation, use the communication time slot immediately following the second message time slot 12 in order to transmit this message again to the first Client. Alternatively, the second message time slot of the R communication time slot can be used, wherein R is a randomly selected integer wherein R≥1 and R<K with K>1. In the event of repeated failure of the transmission of this message, this process can be repeated. Preferably, the value of K for each additional transmission attempt shall be increased. For example, K would be a sequence of values as 1, 5, 10, 20, 40 .... This increase is a spread over time. This is advantageous in the event that there are several second Clients attempting to transmit messages by means of the second message time slot, in order to prevent mutual blocking of these Clients.

FIG. 3 shows a second example of a communication time slot 10b. The second communication time slot 10b is divided correspondingly between the first communications time slot 10a by a transmission time slot 13 and a receiving time slot 14. The transmission time slot 13 is shortened, for example, because there is no message to be sent between Master-Client 2 and Repeater-Slave-Client 3a, 3b. Transmission time slot 13 can be utilized, in this case, to transmit other information, such as network management information.

Within a Management Messages-Slot (MMS), Master-Client 2 may, in particular, confirm to Repeater-Slave-Client 3a, 3b, that a message sent by the Repeater-Slave-Client 3a, 3b in the second message time slot 12 to the Master-Client 2 was received. The confirmation can also be transmitted as part of another message or as a separate message to Repeater-Slave-Clients 3a, 3b.

Receiving time slot 14 includes the first message time slot 11 and the second message time slot 12, with a third message time slot 15 (DMS—Deterministic-Message-Slot). The third message time slot is assigned to the first message time slot 11, from that of Repeater-Slave-Clients 3a, 3b.

Alternatively, communication time slot 10a and the communication time slot 10b can also be assigned to a Parent, for example, one of the Repeater-Slave-Clients 3a, 3b, and its Children, for example, Slave-Client 4 and Repeater-Client 4b and/or Repeater-Slave-Client 4c and Slave-Client 4d. The above arrangements are also applicable to Master-Client 2 and Repeater-Slave-Clients 3a, 3b.

LIST OF REFERENCE NUMBERS

Network 1
Master-Client 2
Repeater-Slave-Client 3a, 3b, 4b, 4c, 5
Slave-Client 4a, 4d
Message transmission 6
Communication time slot 10a, 10b
First message time slot 11
Second message time slot 12
Transmission time slot 13
Receiving time slot 14
Third message time slot 15

The invention claimed is:

1. A network comprising:
at least one first Client and at least two second Clients connected to the first Client by a message transmission device, wherein
the network is configured such that there is communication between the first Client and the at least two second Clients via communication slots,
the communication slots including a first communication period and a second communication period, and
the first Client is connected to the at least two second Clients via a polling process, wherein, according to the polling process, the first Client polls the at least two second Clients for a fixed time interval, which defines a communication slot,
wherein data is transmitted between the first Client and the at least two second Clients in the communication slot, the communication slot having at least one first message slot and a second message slot in the second communication period, and
wherein the at least one first message slot of the communication slot is configured for use by a selected second Client to transmit a message to the first Client, and
the second message slot of the communication slot is configured for use by the at least two second Clients to transmit a message to the first Client, wherein the second message slot is not reserved for a specific one of the at least two second Clients.

2. The network according to claim 1 wherein, upon presence at one second Client out of the at least two second Clients of a message to be transmitted from the one second Client to the first Client, the one second Client, in an immediately following communication slot or in a subsequent R communication slot, where R is a randomly selected integer and R≥1, uses the second message slot to transmit the message to the first Client.

3. The network according to claim 2 wherein the first Client confirms to the one second Client that the message sent by the one second Client to the first Client in the second message slot was received by the first Client.

4. The network according to claim 3 wherein, in the absence of the one second Client receiving confirmation that the message was received by the first Client, the one second Clients again attempts to transmit the message in the second message slot in a next communication time slot.

5. The network according to claim 4 wherein the one second Client in the absence of confirmation of the message in an immediately following communication slot or in a subsequent R communication slot, where R is a randomly selected integer with R≥1 and R<K with K>1, retransmits the message identical to the previously transmitted message in the second message slot to the first Client.

6. The network according to claim 5 wherein the value of K for each additional transmission increases.

7. The network according to claim 1 wherein selection of the selected second Client for transmission of a message to the first Client over a first available message slot takes place using a deterministic process.

8. The network according to claim 7 wherein an order is set as a function of the deterministic process for each of the at least two second Clients' utilization of the first message slot(s) in subsequent communication slots.

9. The network according to claim 1 wherein the communication slot is divided into a transmission slot corresponding to the first communication period and a receiving slot corresponding to the second communication period, wherein, with regard to the transmission slot, the first Client is configured to transmit a message and the one second Client is configured to receive the message, wherein, with regard to the receiving slot, the first Client is configured to receive a message and the one second Client is configured to transmit a message, and wherein the first message slot and the second message slot are components of the receiving slot.

10. The network according to claim 1 wherein the first Client is a Master, and the at least two second Clients are Slaves and/or Repeater-Slaves.

11. The network according to claim 1 wherein the network is structured as a tree structure.

12. The network according to claim 1 wherein the network is designed as a wireless network, and wherein the first Client and the at least two second Clients are radio stations and carry message transmissions using radio waves.

13. A method of network communication, the method comprising:
   communicating between a first Client and a plurality of second Clients via messages characterized by communication slots, the communication slots including a first communication period and at a second communication period;
   connecting the first Client to the plurality of second Clients via a polling process, wherein, according to the polling process, the first Client polls the second Clients for a fixed time interval, which defines a communication slot;
   transmitting data between the first Client and the plurality of second Clients in the communication slot, the communication slot having at least one first message slot and a second message slot in the second communication period; and
   configuring a first message slot within the second communication period for use by a selected second Client to transmit a message to the first Client, and
   configuring the second message slot within the second communication period for use by one or more of the plurality of second Clients to transmit a message to the first Client, wherein the second message slot is not reserved for a specific one of the second Clients.

14. The method according to claim 13 wherein, upon receipt by the first Client of a transmitted message from a second Client, the second Client uses the second message slot to transmit the transmitted message to the first Client in a communication slot immediately following the transmitted message or in a subsequent R communication slot, where R is a randomly selected integer and R≥1.

15. The method according to claim 13 further comprising:
   transmitting a confirmation, by the first Client to the selected second Client, that the message sent by the selected second Client to the first Client in the second message slot was received by the first Client.

16. The method according to claim 15 wherein, in the absence of the confirmation, the plurality of second Clients make another attempt to transmit the message in the second message slot in a subsequent communication slot.

17. The method according to claim 16, further comprising:
   the second Client transmitting, in the absence of receiving the confirmation in an immediately following communication slot or in a subsequent R communication slot, where R is a randomly selected integer with R≥1 and R<K with K>1, the message in the second message slot to the first Client.

18. The method according to claim 17 wherein the value of K for each additional transmission increases.

19. The method according to claim 13 further comprising selecting the selected second Client for communication via a first available message slot using a deterministic process.

20. The method according to claim 19 further comprising:
   setting, as a function of the deterministic process, an order for each of the second Clients' use of first available message slots in subsequent communication slots.

21. The method according to claim 13 further comprising:
   dividing the communication slot into a transmission slot corresponding to the first communication period and a receiving slot corresponding to the second communication period, wherein, with regard to the transmission slot, the first Client is configured to transmit a message and the second Client is configured to receive the message, wherein, with regard to the receiving slot, the first Client is configured to receive a message and the second Client is configured to transmit a message, and wherein the first message slot and the second message slot are components of the receiving slot.

22. The method according to claim 13 wherein the first Client is a Master, and the plurality of second Clients are Slaves and/or Repeater-Slaves.

23. The method according to claim 13 wherein the network is structured as a tree structure.

24. The method according to claim 13 wherein the network is designed as a wireless network, and wherein the first Client and the plurality of second Clients are radio stations and carry message transmissions using radio waves.

* * * * *